United States Patent [19]

Bolton

[11] Patent Number: 4,537,151
[45] Date of Patent: Aug. 27, 1985

[54] PORTABLE FOLDING CORRAL

[76] Inventor: William W. Bolton, 8512 N. 32nd Dr., Phoenix, Ariz. 85021

[21] Appl. No.: 635,934

[22] Filed: Jul. 30, 1984

[51] Int. Cl.³ .............................................. A01K 15/04
[52] U.S. Cl. ....................................... 119/20; 256/25
[58] Field of Search ............................ 119/20; 256/25

[56] References Cited

U.S. PATENT DOCUMENTS

| | | | |
|---|---|---|---|
| 1,198,475 | 9/1916 | O'Gorman | 119/20 X |
| 1,381,892 | 6/1921 | Bute | 119/20 |
| 3,726,256 | 4/1973 | Bernhardt et al. | 119/20 |
| 3,741,529 | 6/1973 | Blagg | 119/20 |
| 3,921,585 | 11/1975 | Hall | 119/20 |
| 4,250,836 | 2/1981 | Smith | 119/20 |
| 4,366,775 | 1/1983 | Tyquin | 119/20 |

Primary Examiner—Hugh R. Chamblee
Attorney, Agent, or Firm—Weiss & Holloway

[57] ABSTRACT

A plurality of panels which are rotatably coupled to each other by sleeves are used to form a portable folding corral for enclosing animals such as horses. The panels may be folded and mounted on a trailer. As a result, the portable folding corral may be easily transported to any site. Each panel has both horizontal and vertical members. Supporting legs slidably fit inside the vertical members and extend below the vertical members to furnish support for the panels. The supporting legs are locked in place by pins which pass through apertures in the legs and vertical members. The corral is rotatably coupled to a vertical support pipe which is fastened to the trailer. After the panels are folded they are placed on top of a horizontal support plate fastened to the trailer. Belts may be used to secure the folded panels to the trailer. A winch or other lifting means may be used to remove the corral from the trailer. In addition, wheels may be used instead of supporting legs. The wheels are attached to the vertical members so that the panels may be easily moved into position in order to form an enclosure.

13 Claims, 10 Drawing Figures

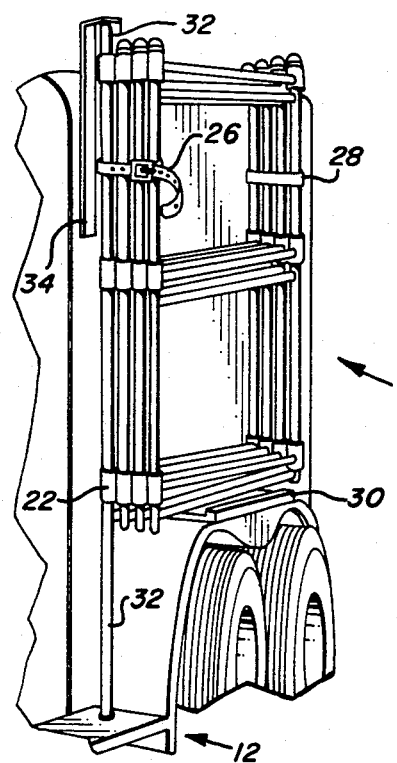
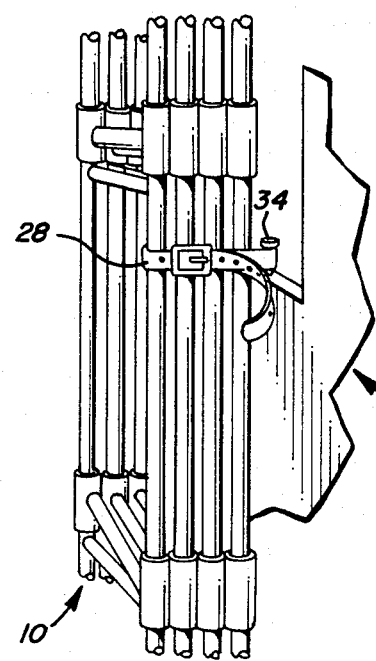
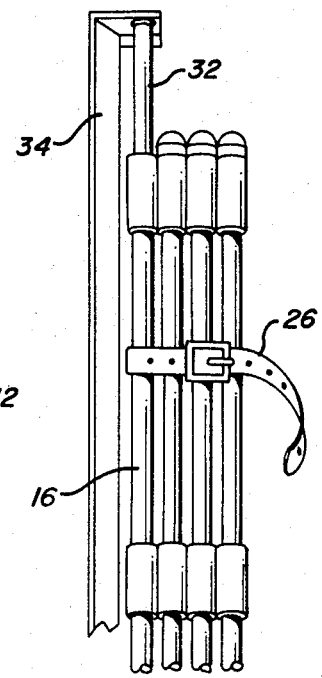
FIG-3　　FIG-4　　FIG-5
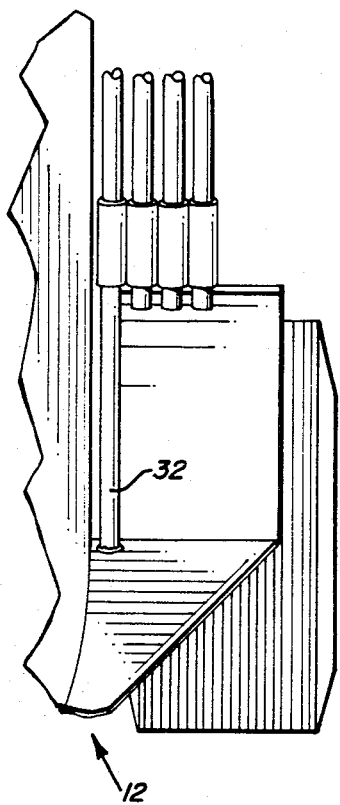
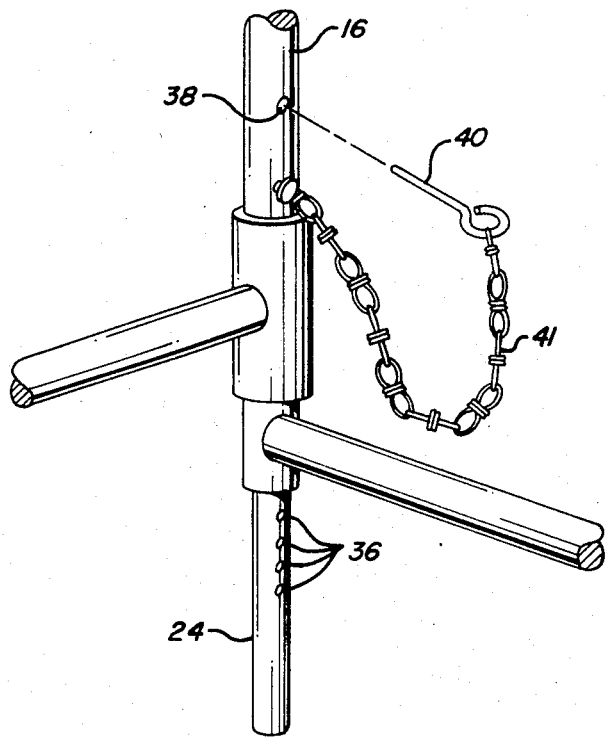
FIG-6　　FIG-7

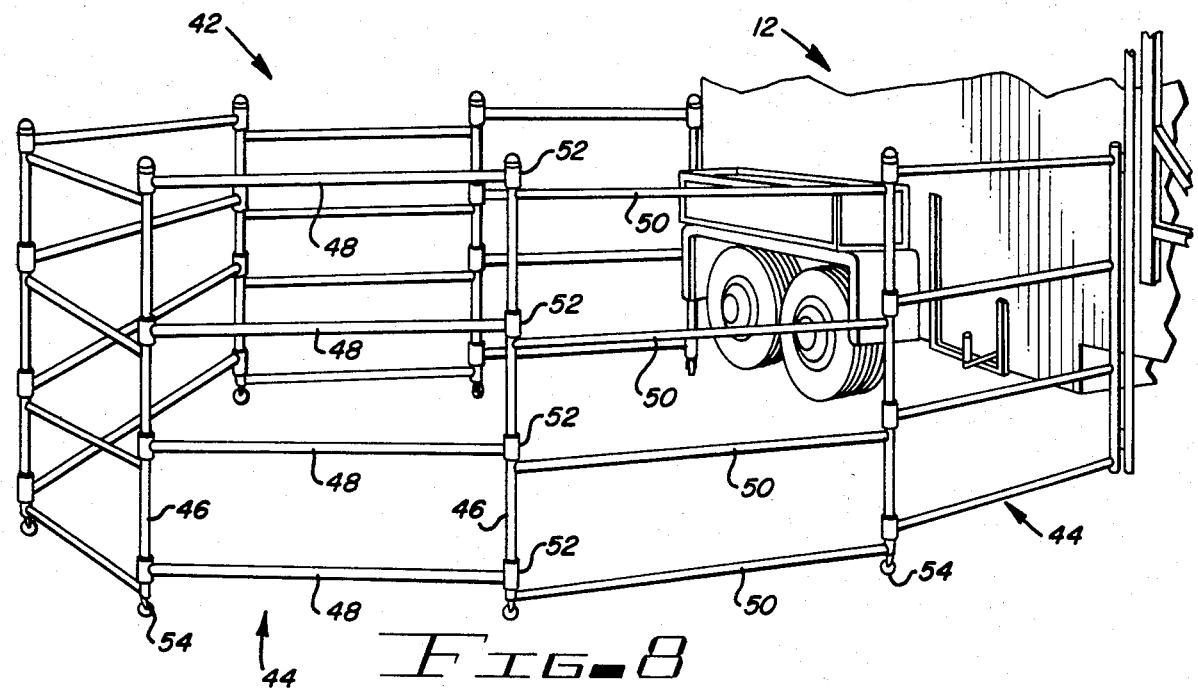
Fig-8
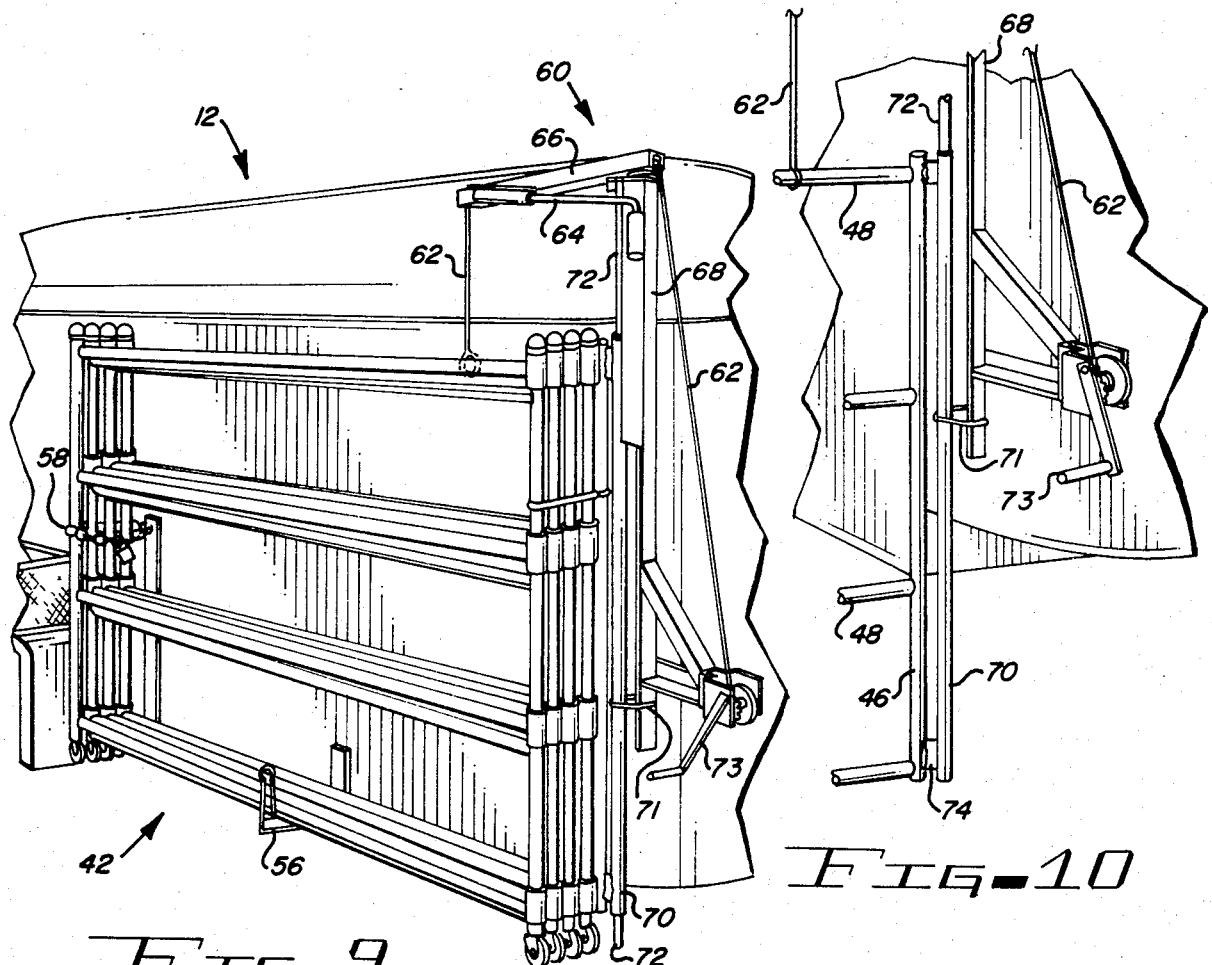
Fig-9
Fig-10

4,537,151

PORTABLE FOLDING CORRAL

BACKGROUND OF THE INVENTION

This invention relates generally to corrals or enclosures for holding animals and, more particularly, to a portable folding corral which may be mounted and transported on a trailer and used to fence in animals such as horses after they are taken out of the trailer.

Very often, difficulty is encountered in locating a corral for animals such as horses that are transported to a location in a trailer. In addition, it is expensive to rent a corral, stall or other enclosure for containing the horses. During long trips, it may be necessary to take the horses out of the trailer at periodic intervals so they will be able to rest or move around. However, this cannot be accomplished unless there is some type of enclosure such as a corral readily available during trips. A portable corral would solve many of these problems.

Accordingly, there is a need for a portable corral that can be transported on a trailer. Such a corral should be made out of lightweight materials so it may be easily mounted on the trailer and removed when necessary. A folding corral consisting of a number of panels would allow the corral to be folded in such a way to facilitate mounting on the trailer. Consequently, there is a need for a lightweight, portable folding corral that may be mounted and transported on a trailer.

SUMMARY OF THE INVENTION

It is an object of this invention to provide an improved portable folding corral.

It is another object of this invention to provide an improved portable folding corral consisting of a number of panels that may be easily folded to facilitate mounting on a trailer.

It is still another object of this invention to provide an improved portable folding corral which may be easily removed from the trailer and assembled to enclose animals such as horses after they are taken out of the trailer.

In accordance with one embodiment of this invention, a portable folding corral for mounting on a trailer is disclosed having, a plurality of panels which are rotatably coupled to each other by sleeves and used to form a corral. The panels may be folded and mounted on a trailer. Each panel has both horizontal and vertical members. Supporting legs slidably fit inside the vertical members and extend below the vertical members to furnish support for the panels. The supporting legs are locked in place by pins which pass through apertures in the legs and vertical members. The corral is rotatably coupled to a vertical support pipe which is fastened to the trailer. After the panels are folded they are placed on top of a horizontal support plate fastened to the trailer. Belts may be used to secure the folded panels to the trailer.

A winch or other lifting means is used to remove the corral from the trailer. In addition, wheels may be used instead of supporting legs. The wheels are attached to the vertical members so that the panels may be easily moved into position in order to form an enclosure.

The foregoing and other objects, features and advantages of the invention will be apparent from the following, more particular, description of the preferred embodiments of the invention, as illustrated in the accompanying drawings.

BRIEF DESCRIPTION OF THE DRAWINGS

FIG. 3 is a perspective view of the corral mounted on the side of the trailer;

FIG. 4 is a perspective view of the corral showing how the free end of the folded panels may be secured to the trailer by a belt;

FIG. 5 is a perspective view of the corral showing how the other end of the folded panels may be secured to the trailer with a belt;

FIG. 6 is a perspective view showing how the bottom of a vertical support pipe is fastened to the trailer;

FIG. 7 is an enlarged perspective view of the bottom end of a vertical member of a typical panel showing how a supporting leg may be locked in place by a removable pin;

FIG. 8 is a perspective view of another embodiment of this invention showing a portable folding corral with wheels attached to its vertical members after the corral has been taken off a trailer and its panels have been positioned to form an enclosure;

FIG. 9 is a perspective view of the corral of FIG. 8 mounted on the side of the trailer showing a winch which was used to mount the corral; and FIG. 10 is an enlarged view of one of the panels shown in FIG. 8 illustrating how the panel is rotatably coupled to a vertical support pipe.

DESCRIPTION OF THE PREFERRED EMBODIMENT

Figure 1:
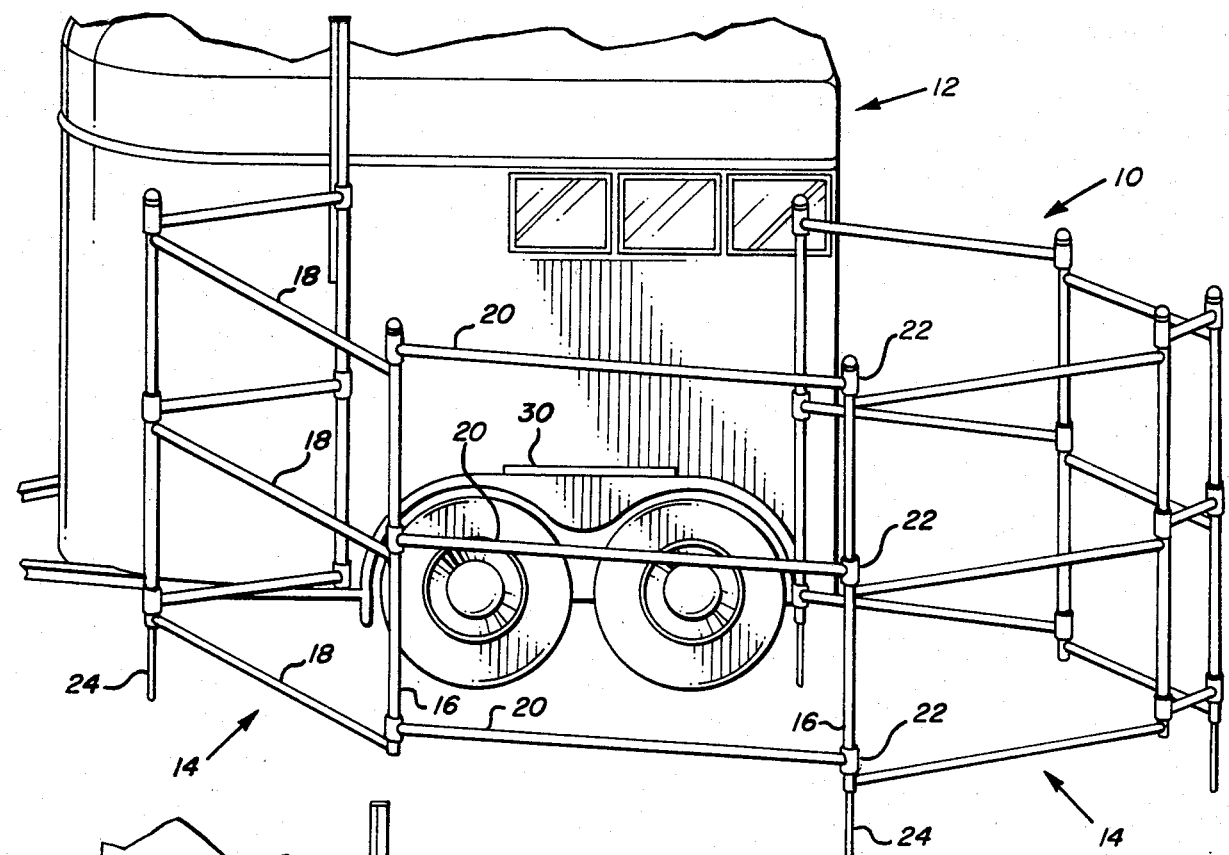
FIG. 1 is a perspective view of a portable folding corral showing the corral after it has been taken off a trailer and its panels have been positioned to form an enclosure.

FIG. 1 is a perspective view of a portable folding corral, generally designated by reference number 10, showing the corral 10 after it has been taken off a horse trailer 12 to form an enclosure for horses. The corral 10 has a plurality of panels 14. Each panel 14 has at least two vertical members 16. As shown in FIG. 1, adjacent panels 14 have common vertical members 16. Some of the panels 14 have a plurality of attached horizontal members 18 fastened (preferably welded) to the vertical members 16 while the remaining panels 14 have a plurality of coupled horizonal members 20 rotatable coupled to the vertical members 16 by sleeves 22. The sleeves 22 are fastened to each end of the coupled horizontal members 20.

It is important to note that other panel configurations may be used if desired. For example, diagonal members may be used instead of the horizontal members 18 and 20 located at the middle of each panel 14. In addition, the panels 14 shown in FIG. 1 have common vertical members 16. In another embodiment (not shown), each panel 14 may have its own vertical members 16. For such a design, the vertical members 16 of adjacent panels 14 may be rotatable coupled together by sleeves 22, or the like. The horizontal members 18 and 20, vertical members 16 and supporting legs 24 are preferably made out of steel pipe. However, they may be made out of a lightweight material such as aluminum, or the like.

The panels 14 are supported by a plurality of supporting legs 24 extending from the bottom of the vertical members 16 (see FIG. 7). Note that FIG. 1 shows supporting legs 24 extending from every other vertical member 16. However, any number of supporting legs 24 may be used.

Figure 2:
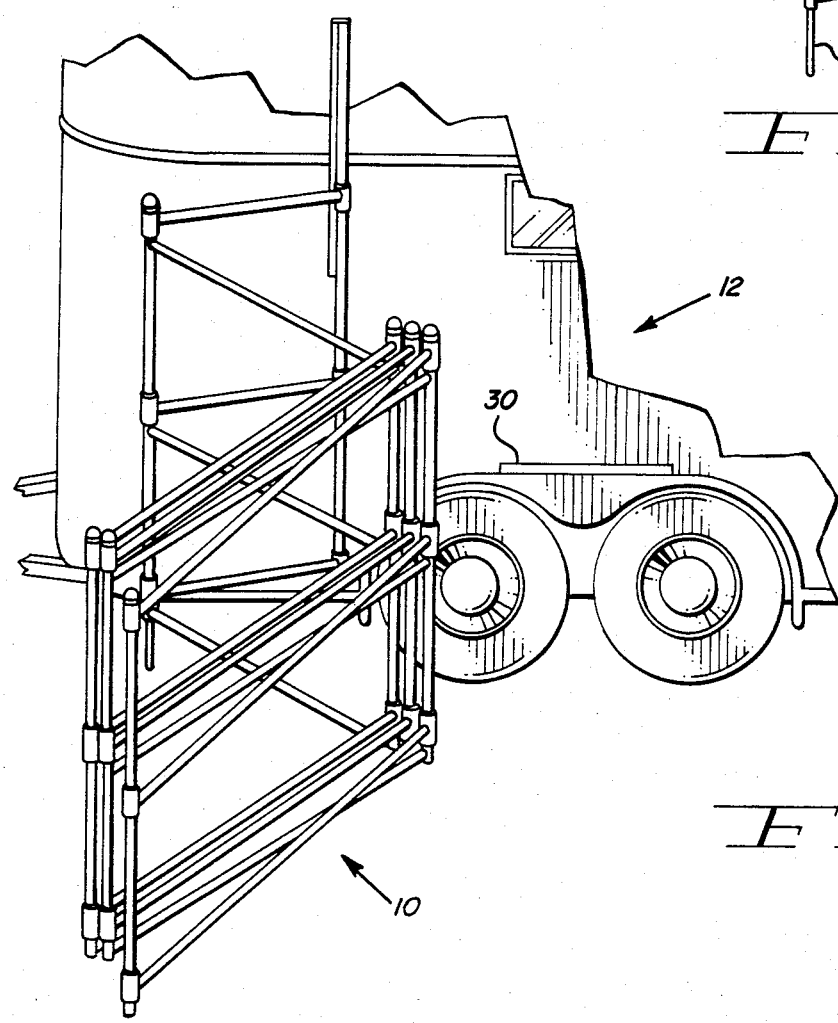
FIG. 2 is a perspective view of the corral with some of its panels folded up prior to mounting the corral on the trailer.

Because the panels 14 are rotatably coupled to each other by the sleeves 22, they may be folded as illustrated in FIG. 2. After the corral 10 is folded, it is mounted on the trailer 12 as shown in FIG. 3. The panel 14 immediately adjacent to the trailer 12 is rotatable coupled to a vertical support pipe 32 secured to the trailer 12. The vertical support pipe 32 fits inside the vertical member 16 (see FIGS. 3 and 5) of the adjacent panel 14. As such, the vertical member 16 acts like an elongated sleeve and allows the adjacent panel to rotate about the vertical support pipe 32. Due to this feature, the corral 10 may be mounted on the trailer 12 after the panels are folded by sliding the vertical member 16 a sufficient distance up the vertical support pipe 32 to allow the folded panels 14 to be placed on top of a horizontal support plate 30. The support plate 30 is fastened to the trailer 12.

After the corral is mounted, it may be secured to the trailer 12 by two belts 26 and 28 (see FIGS. 3, 4 and 5). The free end of the folded panels 14 may be secured by attaching belt 28 to a support 34 as shown in FIG. 4. However, belt 28 may be attached to any available support on the trailer 12. Note that nylon ropes (cords), chains, wire, or the like may be used in place of the belts if desired.

FIG. 5 shows how the top of the vertical support pipe 32 may be fastened to a vertical support plate 34. The vertical support plate 34 may be welded or bolted to the trailer 12. The bottom of the vertical support pipe 32 may be welded to the trailer 12 as shown in FIG. 6. A supporting plate or flange (not shown) may be used to support the bottom of the vertical support pipe 32 if desired. Any desirable means of fastening the vertical support pipe 32 to the trailer 12 may substituted in place of the vertical support plate 34 and welding technique shown in FIG. 6. In addition, the vertical support pipe 32 may be allowed to hang free if the trailer 12 does not have a running board (see FIG. 3). In such a case, a guide member 71 can be used as shown in FIG. 10.

FIG. 7 illustrates how each supporting leg 24 slidable fits inside its vertical member 16. Each supporting leg 24 has a plurality of apertures 36 through it. Likewise, each corresponding vertical member 16 has at least one aperture 38 through it. The supporting legs 24 are actuated by sliding each leg 24 in a downward direction until it rests on the ground and then locking it in place by inserting a pin 40 through the apertures 36 and 38. The pin 40 is preferably secured to the vertical member 16 by a chain 41. Another fastening device such as a cotter pin (not shown) may be used in place of the pin 40, or a nut (not shown), or the like, may be used to secure the pin 40 in place if desired.

FIGS. 8 through 10 show another embodiment of this invention. A portable folding corral 42 is shown with wheels 54 attached to the bottom ends of the vertical members 46. Each panel 44 has attached horizontal members 50 fastened to the vertical members 46 and coupled horizontal members 48 rotatably coupled to the vertical members 46 by a plurality of sleeves 52. Wheels 54 are used instead of supporting legs 24 (see FIGS. 1 and 7) so that the panels 44 may be easily moved into position to form an enclosure for containing animals.

Referring to FIG. 9, the corral 42 is shown mounted on the side of the trailer 12. Note that a chain 58 may be used to secure the corral 52 to the trailer 12. However, a belt, cord, or the like may be used in place of this chain 58 if desired. A winch assembly 60 or other lifting means may be used to lift the corral 42 until it is positioned on top of a support arm 56. The support arm 56 is preferably rotatably coupled to the trailer 12 so that it may be rotated out of the way after the corral 42 is taken off the trailer 12. The winch assembly 60 uses a cable 62 attached to one of the coupled horizontal members 48 to lift the corral 42. A handle 73 is used to wind the cable 62. An electrically powered winch assembly (not shown) or any other type of winch assembly may be used in place of the hand winch assembly 60 shown in FIG. 9 if desired. The winch assembly 60 is attached to a vertical support 68 which is fastened to the trailer 12. The winch assembly 60 has a rotating arm 66 and rotating rod 64 rotatably coupled to the top of the vertical support 68. The rotating arm 66 and rotating rod 64 allow the cable 62 to rotate as the panels 44 are moved into position.

FIG. 10 shows how one of the panels 44 is rotatably coupled to the trailer 12. The ends of the coupled horizontal members 48 of the panel 44 are fastened (preferably welded) to one of the vertical members 46 which is attached to a vertical pipe 70. Members 74 may be used to attach the vertical member 46 to the vertical pipe 70 if desired. A vertical support pipe 72 fits inside the vertical pipe 70. The vertical support pipe 72 is fastened to the top end of the vertical support 68. The vertical pipe 70 is free to rotate about the vertical support pipe 72 and to slide up and down its length. Guide member 71 helps to guide the vertical pipe 70 as the winch assembly 60 moves it up and down the vertical support pipe 72.

While the invention has been particularly shown and described in reference to preferred embodiments thereof, it will be understood by those skilled in the art that changes in the form and details may be made therein without departing from the spirit and scope of the invention.

I claim:

1. A portable folding corral for mounting on a trailer, comprising:
    folding panel means for forming an enclosure to contain animals such as horses including a plurality of panels rotatably and permanently coupled to each other by sleeve means for allowing said plurality of panels to be folded and for allowing said plurality of panels to be extended in order to form one continuous enclosure, one end of said folding panel means being rotatably coupled to said trailer;
    mounting means for mounting said folding panel means on said trailer including means coupled to said trailer and said folding panel means for raising and lowering said folding panel means in order to mount said folding panel means on the outside of said trailer and to lower said folding panel means to form said enclosure; and
    securing means for securing said folding panel means to said trailer.

2. The portable folding corral of claim 1, wherein said mounting means further comprises:
    a vertical support pipe coupled to said trailer, one of said folding panel means being rotatably and slidably coupled to said vertical support pipe; and
    a horizontal support plate fastened to said trailer, said folding panel means being placed on top of said horizontal support plate in order to mount said folding panel means on said trailer.

3. The portable folding corral of claim 1, wherein said securing means comprises at least one belt securing said folding panel means to said trailer.

4. The portable folding corral of claim 1, wherein said securing means comprises at least one chain securing said panels to said trailer.

5. The portable folding corral of claim 1, wherein said securing means comprises at least one nylon cord securing said folding panel means to said trailer.

6. The portable folding corral of claim 1, wherein said securing means comprises wire securing said folding panel means to said trailer.

7. The portable folding corral of claim 1, wherein each of said plurality of panels includes vertical members and horizontal members.

8. The portable folding corral of claim 7, wherein said plurality of panels which are adjacent to each other have common vertical members.

9. The portable folding corral of claim 8, wherein said folding panel means further comprises a plurality of wheels attached to said vertical supports.

10. The portable folding corral of claim 8, wherein said folding panel means further comprises a plurality of supporting legs, each of said supporting legs extending from one of said vertical members.

11. The portable folding corral of claim 10, wherein each of said supporting legs slidably fits inside one of said vertical members, said supporting legs and corresponding vertical members having apertures through them so that a pin may be inserted through each of said supporting legs and its corresponding vertical member in order to lock each of said supporting legs in place.

12. The portable folding corral of claim 11, wherein said mounting means further comprises:
a vertical support pipe coupled to said trailer, one of said panels being rotatably and slidably coupled to said vertical support pipe; and
a horizontal support plate fastened to said trailer, said panels being placed on top of said horizontal support plate after they are folded in order to mount said panels on said trailer.

13. The portable folding corral of claim 12, wherein said securing means comprises at least one belt securing said panels to said trailer after they have been folded.

* * * * *